(12) United States Patent
Gunawan et al.

(10) Patent No.: US 12,135,398 B2
(45) Date of Patent: Nov. 5, 2024

(54) MULTIPLE DIPOLE LINE TRAP SYSTEM

(71) Applicant: INTERNATIONAL BUSINESS MACHINES CORPORATION, Armonk, NY (US)

(72) Inventors: Oki Gunawan, Westwood, NJ (US); Bruce Gordon Elmegreen, Goldens Bridge, NY (US); Jason Kristiano, Itabashi-ku (JP); Michael Gilbert, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 17/643,897

(22) Filed: Dec. 13, 2021

(65) Prior Publication Data
US 2023/0184970 A1 Jun. 15, 2023

(51) Int. Cl.
*G01V 1/18* (2006.01)
*G01C 19/24* (2006.01)

(52) U.S. Cl.
CPC ............ *G01V 1/184* (2013.01); *G01C 19/24* (2013.01)

(58) Field of Classification Search
CPC ......... G01V 1/184; G01V 1/164; G01C 19/24
USPC ........................................................ 367/184
See application file for complete search history.

(56) References Cited

U.S. PATENT DOCUMENTS

| | | | |
|---|---|---|---|
| 3,493,275 A | 2/1970 | Stone | |
| 4,300,220 A * | 11/1981 | Goff | G01V 1/16 367/188 |
| 4,792,931 A | 12/1988 | Nishida | |
| 5,365,671 A | 11/1994 | Yaniger | |
| 5,642,089 A | 6/1997 | Lysen | |
| 7,194,173 B2 * | 3/2007 | Shtein | H10K 30/451 385/128 |
| 7,252,001 B2 | 8/2007 | Boletis | |
| 7,597,002 B2 | 10/2009 | Moser | |
| 7,859,157 B2 * | 12/2010 | Baur | H02N 15/00 310/90.5 |
| 8,109,142 B2 | 2/2012 | Bratkovski | |

(Continued)

FOREIGN PATENT DOCUMENTS

| | | |
|---|---|---|
| DE | 102010012970 A1 | 1/2014 |
| WO | 2012090134 A2 | 7/2012 |

OTHER PUBLICATIONS

Merchant, B. John, "MEMS Applications in Seismology", Nov. 11, 2009, Seismic Instrumentation Technology Symposium, 31 pages.

(Continued)

*Primary Examiner* — Luke D Ratcliffe
*Assistant Examiner* — Vikas Atmakuri
(74) *Attorney, Agent, or Firm* — Matthew Zehrer

(57) ABSTRACT

The present disclosure includes dipole line trap system, a method for tuning a natural frequency of a dipole line trap system, and seismometer. One embodiment of the dipole line trap system may comprise a first axis unit. The first axis unit may comprise a first group of at least three cylindrical diametric magnets mounted in parallel around a first open region, and a first diamagnetic object in the first open region. In some embodiments, the first axis unit may comprise four cylindrical diametric magnets mounted in parallel around the first open region. In some embodiments, the first axis unit may have a natural frequency of less than 1 Hz.

17 Claims, 15 Drawing Sheets

(56) References Cited

U.S. PATENT DOCUMENTS

| | | |
|---|---|---|
| 8,895,355 B2 | 11/2014 | Cao |
| 9,041,389 B2 | 5/2015 | Gokmen |
| 9,093,377 B2 | 7/2015 | Cao |
| 9,236,293 B2 | 1/2016 | Cao |
| 9,263,669 B2 | 2/2016 | Cao |
| 9,336,935 B2 * | 5/2016 | Michaelis ............ H01F 7/0236 |
| 9,424,971 B2 | 8/2016 | Cao |
| 9,978,493 B2 | 5/2018 | Gunawan |
| 10,031,058 B2 | 7/2018 | Gunawan |
| 10,082,408 B2 | 9/2018 | Gunawan |
| 10,128,013 B1 | 11/2018 | Gunawan |
| 10,197,640 B2 | 2/2019 | Gunawan |
| 10,234,286 B2 | 3/2019 | Gunawan |
| 10,352,797 B2 | 7/2019 | Gunawan |
| 10,564,175 B2 * | 2/2020 | Elmegreen ............ G01P 15/093 |
| 10,564,303 B2 * | 2/2020 | Gunawan ................ G01V 1/18 |
| 10,613,249 B2 | 4/2020 | Gunawan |
| 10,800,268 B2 * | 10/2020 | Gunawan ............ B60L 15/005 |
| 10,983,230 B2 | 4/2021 | Gunawan |
| 11,175,305 B2 | 11/2021 | Elmegreen |
| 2008/0143323 A1 | 6/2008 | Akahane |
| 2014/0000712 A1 * | 1/2014 | Cao ................ H01L 31/022441 |
| | | 257/E31.007 |
| 2014/0028306 A1 | 1/2014 | Gokmen |
| 2017/0011876 A1 | 1/2017 | Natti |
| 2017/0045433 A1 | 2/2017 | Gunawan |
| 2018/0031716 A1 | 2/2018 | Gunawan |
| 2018/0095147 A1 * | 4/2018 | Gunawan ............ G01R 33/12 |
| 2019/0140562 A1 | 5/2019 | Henderson |
| 2020/0150298 A1 | 5/2020 | Gunawan |
| 2020/0286655 A1 | 9/2020 | Gunawan |
| 2020/0326306 A1 | 10/2020 | Gunawan |
| 2021/0025918 A1 | 1/2021 | Elmegreen |
| 2021/0278556 A1 | 9/2021 | Elmegreen |

OTHER PUBLICATIONS

The International Search Report and the Written Opinion of the International Searching Authority, International application No. PCT/EP2022/086053, Date of mailing: Mar. 21, 2023 (Mar. 21, 2023), 15 pages.

Chen, Kou-Cheng & Wang, Jeen-Hwa & Huang, Bor-Shouh & Liu, Chun-Chi & Huang, Win-Gee. (2013). Vibrations of the Taipei 101 Skyscraper Induced by Typhoon Fanapi in 2010. Terrestrial, Atmospheric and Oceanic Sciences. 24. 1. 10.3319/TAO.2012.09.17.01(T).

Gunawan, Oki & Virgus, Yudistira & Tai, Kong Fai. (2015). A parallel dipole line system. Applied Physics Letters. 106. 062407. 10.1063/1.4907931.

Li et al; "Development of a High-Sensitivity Optical Accelerometer for Low-Frequency Vibration Measurement", Sensors MDPI, Sensors 2018, 18, 2910; doi:10.3390/s18092910, pp. 1-15, <www.mdpi.com/journal/sensors>.

List of IBM Patents or Patent Applications Treated as Related.

Oki Gunawan and Yudistira Virgus, "The one-dimensional camelback potential in the parallel dipole line trap: Stability conditions and finite size effect", Journal of Applied Physics 121, 133902 (2017) https://doi.org/10.1063/1.4978876.

William H. K. Lee, Heiner Igel, Mihailo D. Trifunac; Recent Advances in Rotational Seismology. Seismological Research Letters 2009;; 80 (3): 479-490. doi: https://doi.org/10.1785/gssrl.80.3.479.

* cited by examiner

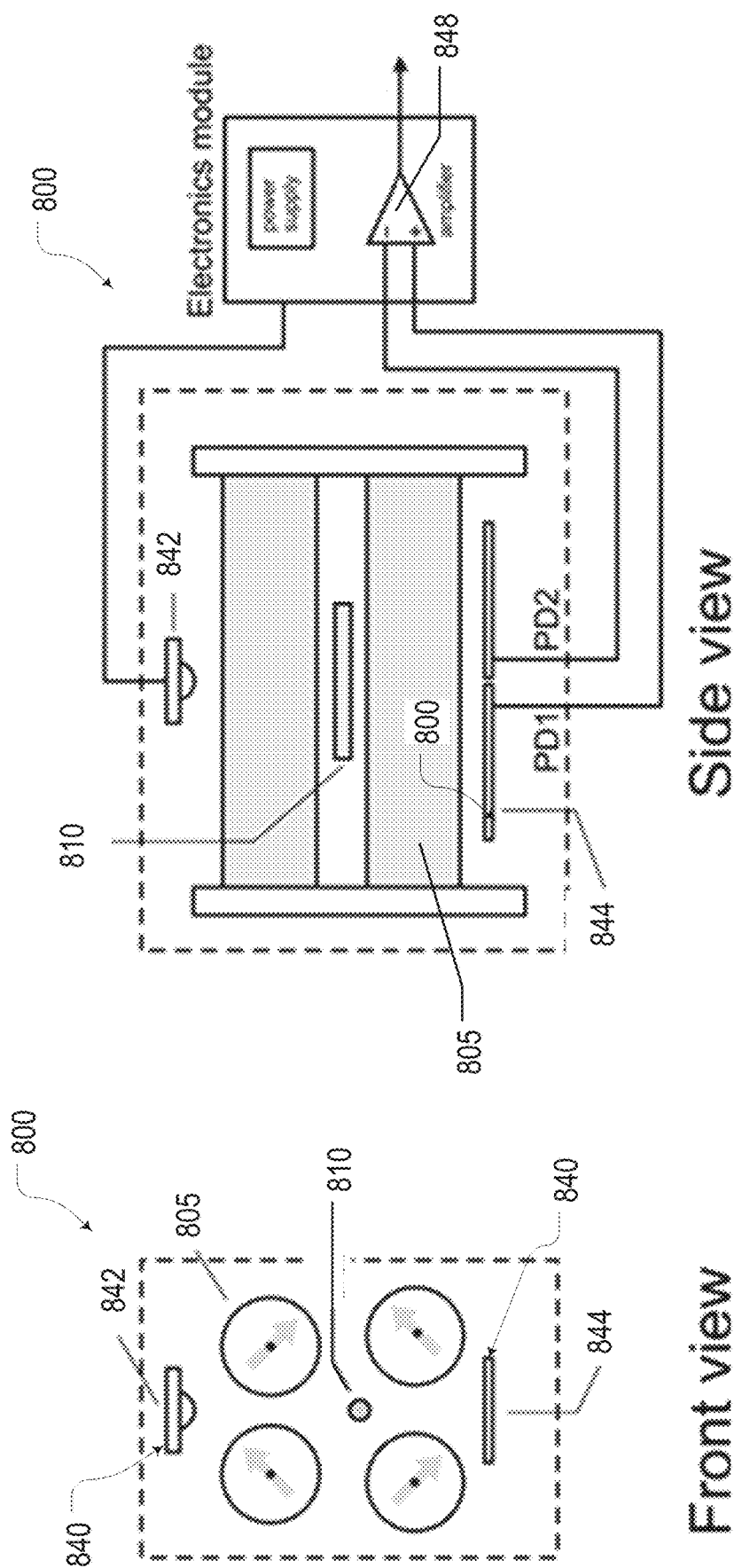

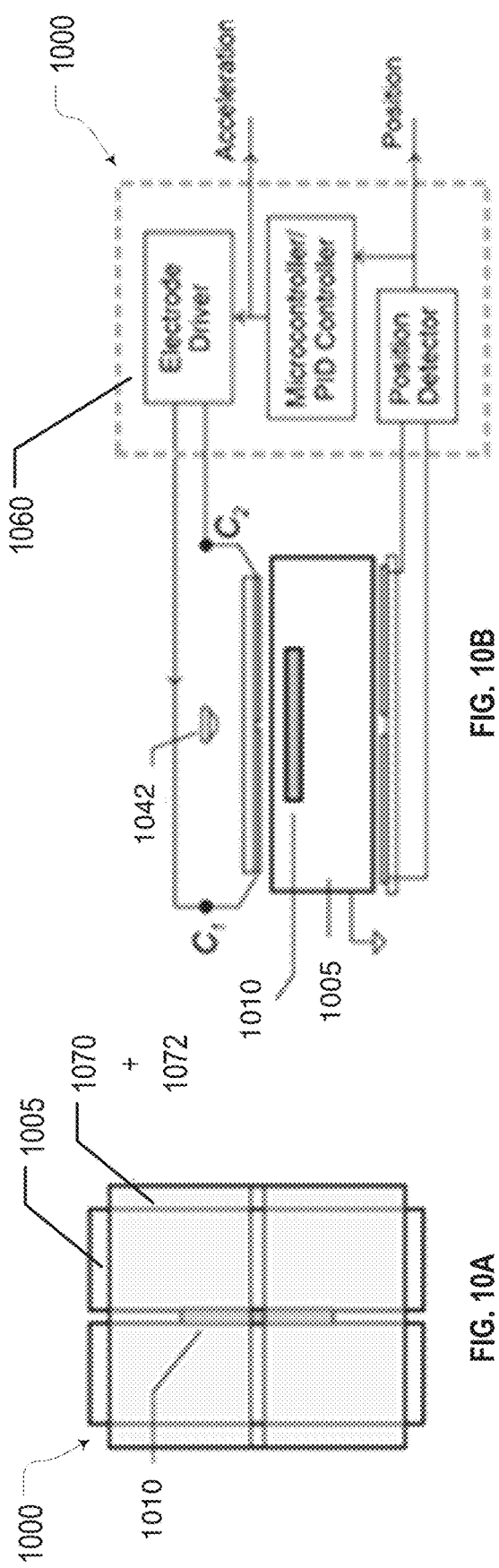
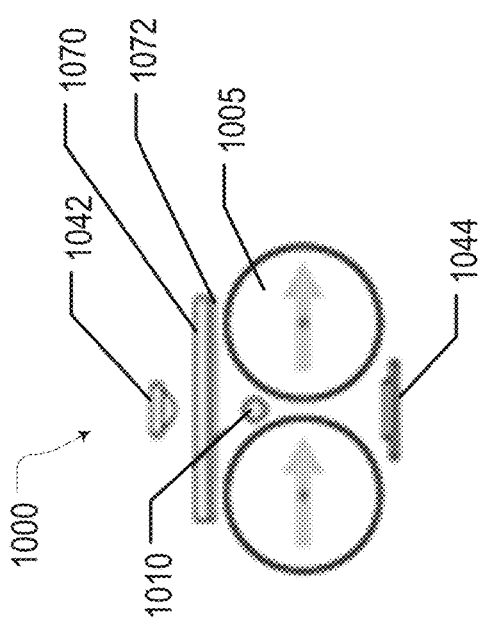
FIG. 10A
FIG. 10B
FIG. 10C

FRONT VIEW

TOP VIEW

SIDE VIEW

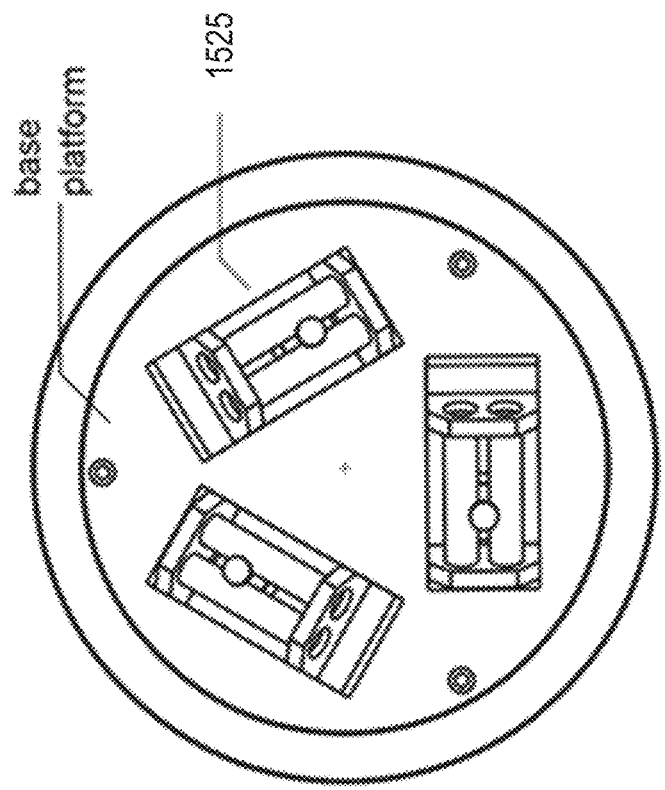
FIG. 15B TOP VIEW
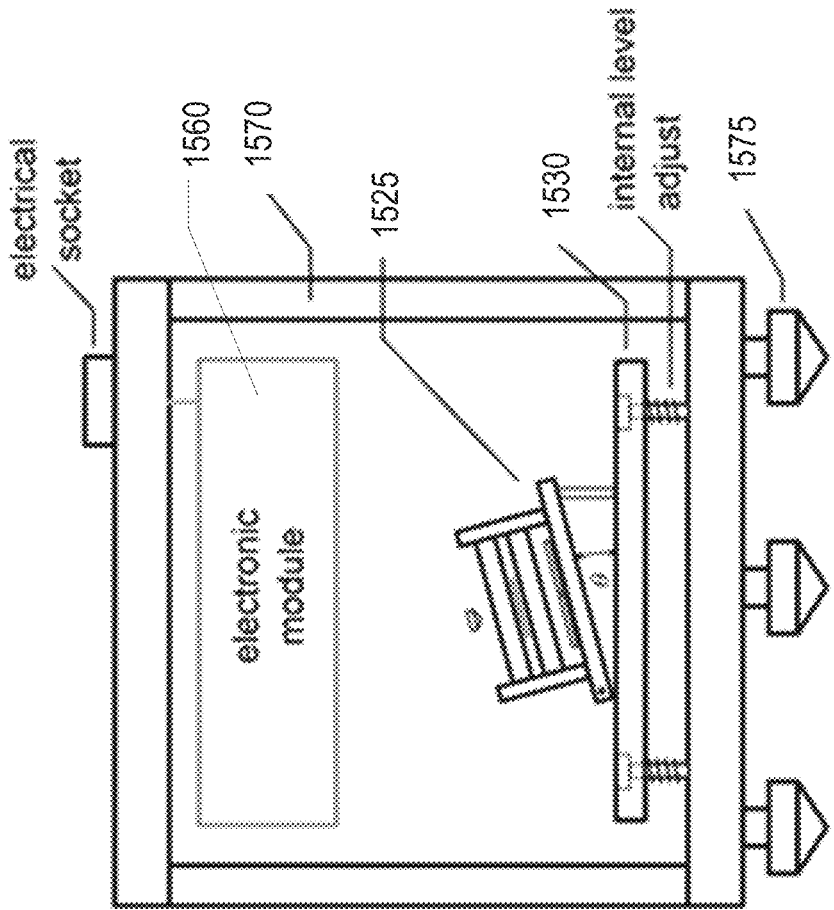
FIG. 15A SIDE VIEW

MULTIPLE DIPOLE LINE TRAP SYSTEM

BACKGROUND

The present disclosure relates to sensors, and more specifically, to sensors comprising multiple dipole line trap systems.

Inertial sensors generally refer to a type of sensor that measures and reports a specific force, angular rate, or an orientation of an object. Inertial sensors typically consist of a combination of accelerometers, gyroscopes, and/or magnetometers.

Tiltmeters generally refer to a type of sensor that measures small changes from the vertical plane. Precision tiltmeters are useful for detecting sagging and/or oscillations in structures or of the ground. Common applications for such precision tiltmeters include monitoring the ground tilt at fracking sites or other regions with changing underground pressures, and monitoring motion of underground magma or gas that can deform the surface of a volcano prior to an eruption.

Seismometers generally refer to a type of sensor designed to measure vibrations, such as those from earthquakes, volcanic activities, landslides activities, and civic activities. Seismometers may be used for tsunami monitoring, structural health monitoring, seismic alarms, or to monitor manmade activities such as explosions. Existing seismometers rely on a suspended oscillator to detect the vibrations. This includes physical pendula, spring-mass systems, cantilevers, and geophones.

Infrasound generally refers to vibrations that occur a frequency less than audible frequency e.g., less than about 20 Hz. Infrasound detectors, in turn, are sensors designed to detect and measure infrasound. Infrasound detectors may be used to monitor: (i) natural events, such as thunder, wind, waves, waterfalls, aurora, large meteors, upper atmosphere disturbances, (ii) natural disasters, such as tremors, earthquakes, landslides, avalanches, fracturing icebergs, tornados, volcanic eruptions, and tsunamis; (iii) civil activity, such as bridge and building movements and wind farms; (iv) human activities, such as traffic, aircraft, explosions, trains, and fireworks; (5) animal activities, such as motion and vocalization from elephants and other large mammals or large herds of small animals, (6) surveillance, such as the detection of missile launches; and (7) engineering, such as monitoring machine operations.

Cylindrical diametric magnets (CDMs) are a type of cylindrical magnet with magnetization along its diameter. The article by O. Gunawan, Y. Virgus, and K. Fai Tai entitled *A parallel dipole line system* in Appl. Phys. Lett. 106, 062407 (2015) presents a study of a parallel linear distribution of transverse dipole system, which can be realized using a pair of cylindrical diametric magnets. The system can serve as a trap for a cylindrical diamagnetic object, can produce a one-dimensional camelback potential profile at its center plane, can yield a technique for measuring magnetic susceptibility of the trapped object, and can serve as a system to implement highly sensitive Hall measurement utilizing rotating parallel dipole line system and lock-in detection.

SUMMARY

According to embodiments of the present disclosure, a dipole line trap system comprising a first axis unit. The first axis unit may comprise a first group of at least three cylindrical diametric magnets mounted in parallel around a first open region, and a first diamagnetic object in the first open region. In some embodiments, the first axis unit may comprise four cylindrical diametric magnets mounted in parallel around the first open region. In some embodiments, the first axis unit may have a natural frequency of less than 1 Hz.

According to embodiments of the present disclosure, a method for tuning a natural frequency of a dipole line trap system. The dipole line trap system may comprise at least three diametrically magnetized cylindrical magnets mounted in parallel around an open region and having spacings therebetween; and a diamagnetic object in the open region. The method for tuning may comprise changing the spacings between the at least three diametrically magnetized cylindrical magnets relative to the other diametrically magnetized cylindrical magnets. In some embodiments, the at least three diametrically magnetized cylindrical magnets may include a magnetization angle, and the method of tuning may further comprise changing one or more of the magnetization angles relative to the other magnetization angles.

According to embodiments of the present disclosure, a seismometer comprising at least two cylindrical diametric magnets, and a diamagnetic rod levitated by the two cylindrical diametric magnets. Some embodiments may further comprise an electrode adapted to control a position of the diamagnetic rod using electrostatic forces. Some embodiments may further comprise an electronics system adapted to provide negative feedback to bias the diamagnetic rod toward a center position.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 8A and 8B are front and side views of an illustrative first inertial sensor, consistent with some embodiments.

FIGS. 10A, 10B, and 10C are top, side, and front views of an illustrative third sensor, consistent with some embodiments.

FIGS. 15A-15B are side and top views of a complete sensor unit, consistent with some embodiments.

Figure 1:
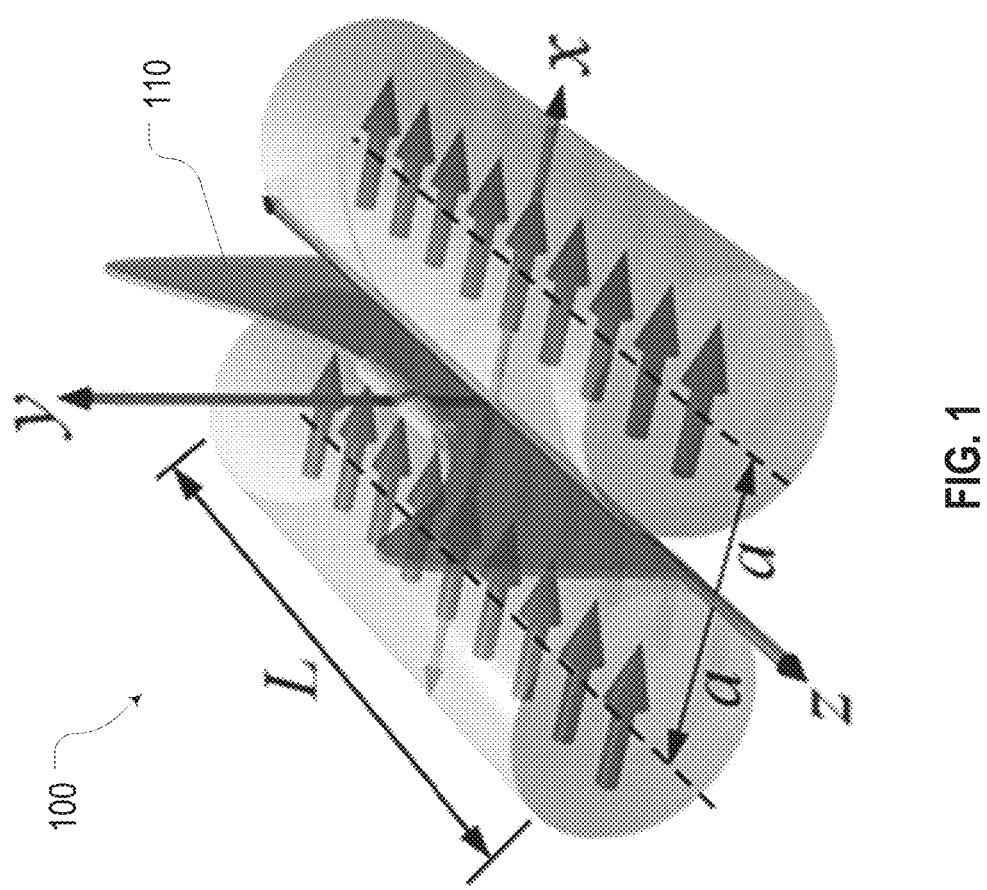
FIG. 1 is a perspective view of a system consisting of two CDMs aligned in parallel.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to sensors; more particular aspects relate to sensors comprising multiple dipole line trap systems. While the present disclosure is not necessarily limited to such applications, various aspects of the disclosure may be appreciated through a discussion of various examples using this context.

Many remote sensing systems and devices are enhanced by sensitivity to low frequencies e.g., less than about 20 Hz. For example, in teleseismic monitoring applications, sensitivity to the low frequency components of earthquake oscillations may enhance detection range as the low frequency oscillations of earthquakes typically travel the greatest distances. Similarly, sensitivity to low frequencies may help for structural monitoring applications as the resonant motions of large buildings, bridges, and ships typically occur at low frequencies.

Accordingly, one aspect of the disclosure is a parallel dipole line (PDL) trap system comprising multiple ("N") CDMs surrounding a diamagnetic object, where "N" is two or more. Specific embodiments with N=3, 4, 5, and 6 are described in more detail below. Laboratory experiments have shown that such PDL trap systems may be configured to have a very low natural frequency to about 0.1 Hz, and as a result, may be well adapted for use as a low frequency sensor. Systems comprising PDL trap systems consistent with some embodiments may be desirable for use as inertial sensors, tiltmeters, and seismometers used to measure acceleration, velocity, infrasound, and/or displacement due to earthquakes, ground movement, and/or structural loading. Additionally, systems comprising PDL trap systems may be desirable to measure and/or infer other physical properties of systems, such as a pressure or fluid viscosity.

Another aspect of the disclosure is a method of tuning the natural frequency of a PDL trap system and/or the camel-back-shaped magnetic potential of the PDL trap system. This method may include controlling the dimensions of the PDL trap system, such as the rad(ii) of the CDMs and the separation(s) of the CDMs that comprise the PDL trap system. Yet another aspect of the disclosure is a method for tuning of the sensitivity of PDL trap system, such that the trapped inertial mass (e.g., a diametric object) moves a greater or lesser distance for a given input (e.g., a tilt angle).

One feature and advantage of some embodiments is that they may neither use nor require an attachment between the inertial mass and a housing. This feature and advantage may be desirable because the attachment(s) used by many prior art devices will restrict relative motion between the inertial mass and the housing, preventing extremely sensitive detection of some motions. Those skilled in the art will appreciate that this feature and advantage may be particularly beneficial as applied to seismometers, infrasound detectors, and gravity field strength detectors.

Another feature and advantage of some embodiments is that they may contain and levitate the inertial mass regardless of the orientation/rotation of the PDL trap system, thereby extending the versatility of the resulting sensors. Those skilled in the art will appreciate that this feature and advantage may be beneficial in environments and applications where the movement and/or orientation of the resulting sensor(s) cannot be limited to a single plane, such as inertial sensors used in certain transportation systems. Some embodiments may further enhance containment of the inertial mass by adding a non-magnetic wall or window at the ends of the respective systems.

One specific embodiment of the disclosure is a broadband seismometer. For seismic monitoring applications, a broadband seismometer having a very low natural frequency (e.g., down to 0.01 Hz) is very desirable to detect long distance seismic events (e.g., at a distance greater than about 1000 km). The information coming from a network of such broadband seismometers may be used to determine the characteristics of the earthquake, such as its epicenter, magnitude, and focal mechanism. This embodiment may comprise one to three axis units. Each axis unit, in turn, may comprise two or more CDMs that cooperate to form a levitation trap for a diamagnetic object, such as a graphite cylinder. Each axis unit may also be positioned at a tilted angle to a horizontal plane. By combining outputs from the tilted axis units, a Cartesian north-west-vertical (see FIG. 16) motion can be calculated. This embodiment may operate in two ways: (i) a passive way, in which the seismic vibration may be detected by measuring the position of the levitating diamagnetic object; and (ii) an active way, in which electrostatic actuators may be used to keep the diamagnetic object in the center of the sensor, and in which seismic vibration is detected as the voltage bias needed to stabilize the diamagnetic object.

A second specific embodiment of a broadband seismometer may comprise a set of two to four CDMs arranged to form a PDL trap system, and a diamagnetic object (such as a graphite cylinder) at the center of the trap. The CDMs may be active or passive depending whether negative feedback is desired to position the diamagnetic object in the center of the PDL trap system. The position of the diamagnetic object may be detected using a split photodetector. A set of capacitive electrodes surrounding the diamagnetic object may be used to apply electrostatic force to provide the negative feedback actuation force.

Turning now to the figures, FIG. 1 is a perspective view of a system 100 consisting of two CDMs aligned in parallel. This system 100 produces the camelback magnetic potential 110 depicted in FIG. 1.

Figure 2:
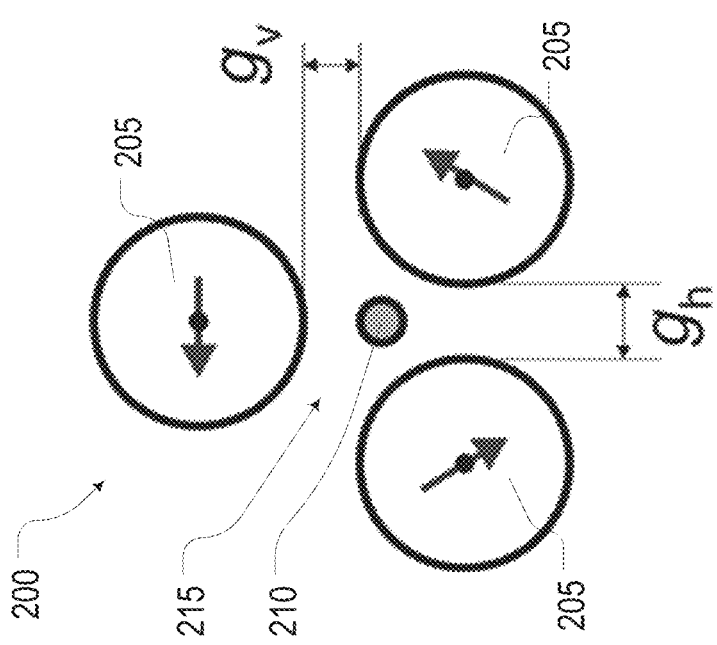
FIG. 2 is a side view of a triple dipole line (TDL) magnetic trap system, consistent with some embodiments.

FIG. 2 is a side view of a triple dipole line (TDL) magnetic trap system 200, consistent with some embodiments. The TDL system 200 in FIG. 2 comprises three CDMs 205 held in parallel and in an equilateral triangle configuration by a rigid housing (not shown) with transverse magnetization angles. The appropriate transverse magnetization angles may depend on the vertical gap of the system 200. As depicted, the transverse magnetization angles for example system 200 are at 60, 180, and 300 degrees from the horizontal. This TDL system 200 may further comprise a diamagnetic material 210, such as graphite cylinder, in a gap 215 between the CDMs 205. The resulting azimuthal magnetic configuration may exhibit an equilibrium state such that the CDMs 205 may relax and stick together within a fixture (not shown. See FIG. 15 for one suitable embodiment) without needing additional physical supports.

One feature and advantage of the TDL system 200 in FIG. 2 is that, for the right combination of magnetization, magnetic susceptibility, and system dimensions, the diamagnetic material 210 may levitate against the force of gravity in the central gap 215, and this levitation may be independent of the exact orientation of the three CDMs 205 relative to vertical as long as their respective cylindrical axes are approximately horizontal (e.g., so the diamagnetic cylinder 210 does not fall out of the ends of the gap 215). That is, the diamagnetic material 210 may levitate in the gap 215 even if the system 200 is not exactly horizontal.

Figure 3:
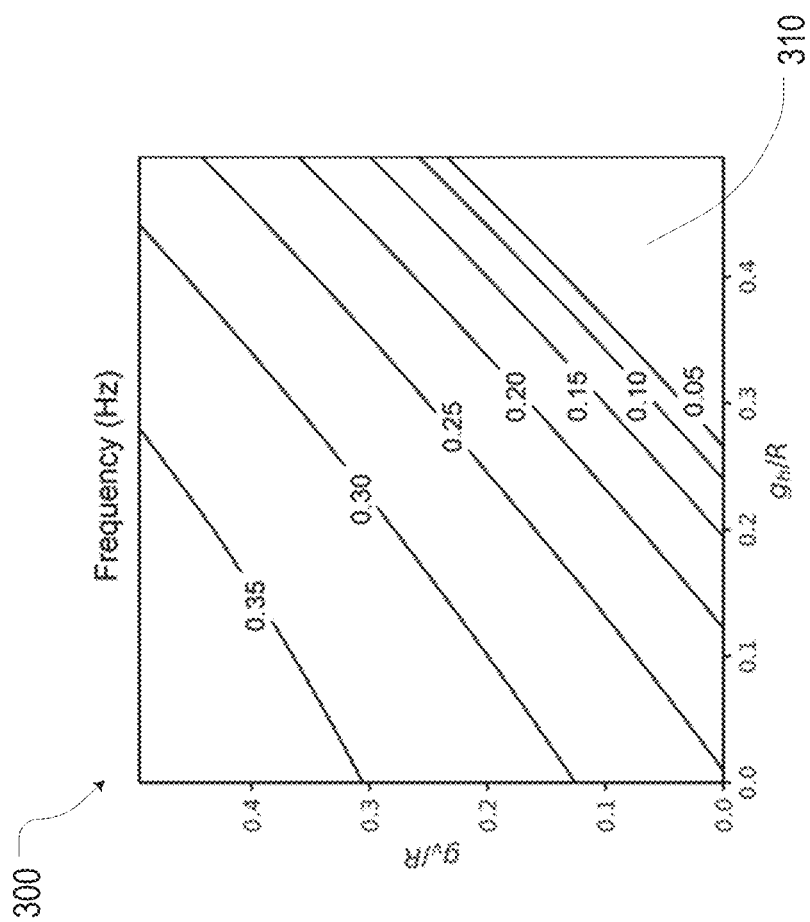
FIG. 3 is a plot showing the natural frequency of the TDL system of FIG. 2 as a function of the vertical gap ($g_v$) and the horizontal gap ($g_h$).

The TDL trap system 200 in FIG. 2 may have two parameters that can be tuned to obtain a desired natural frequency: (i) a vertical gap ($g_v$) distance shown in FIG. 2, and (ii) a horizontal gap ($g_h$) distance shown in FIG. 2. FIG. 3 is a contour plot 300 showing the natural frequency of the TDL system 200 of FIG. 2 as a function of the vertical gap ($g_v$) and the horizontal gap ($g_h$) for a TDL system using standard CDM magnets with magnetization of M=1.1×10$^6$ A/m and magnet radius of R=3.18 mm. and length L=25.4 mm. As can be seen in FIG. 3, a high natural frequency may be obtained when the horizontal gap is small and the vertical gap is large, and a low natural frequency may be obtained when the horizontal gap is large and the vertical gap is small. The bottom-right region 310 in FIG. 3 corresponds to an unstable equilibrium of the diamagnetic material 210 e.g., when it falls out of the TDL trap system 200. As can be seen in FIG. 3, a natural frequency as low as 0.05 Hz can be achieved.

Figure 4A:
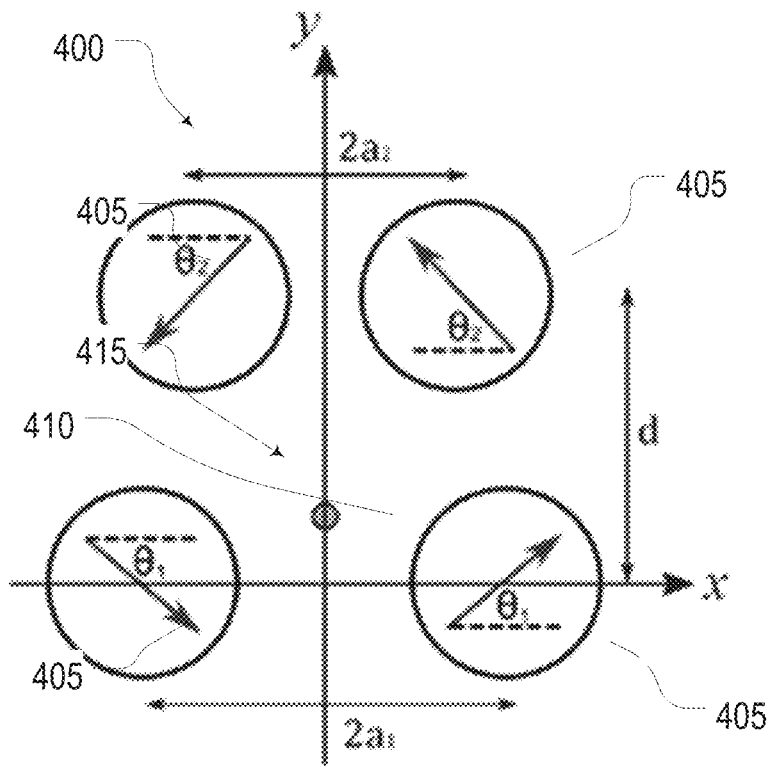
FIG. 4A is a side view of a quadruple dipole line (QDL) magnetic trap system, consistent with some embodiments.

The oscillation frequency may be further lowered in some embodiments by adding another magnet to form quadruple dipole line (QDL) system. FIG. 4A shows a side view of a QDL magnetic trap system 400, consistent with some embodiments. The QDL system 400 embodiment in FIG. 4A comprises four CDMs 405 held in parallel and in a trapezoid configuration by a rigid housing (not shown), and a cylinder of diamagnetic cylinder 410 trapped in a gap 415 between the CDMs 405. As shown in FIG. 4A, each CDM 405 in this embodiment may have its magnetization angle tilted with respect to the magnetization angle of the other CDMs 405 such that the system 400 forms a stable configuration, e.g., at angle $\theta_1$ and $\theta_2$ (e.g., as shown, at approximately 60, 120, 240, and 300 degrees from the horizontal). The total potential energy (per unit length) of the resulting QDL system 400 may be calculated as:

$$U_T = \frac{\mu_0 m_L^2}{2\pi}\left\{-\frac{1}{4a_1^2} - \frac{1}{4a_2^2} + \frac{2\cos(\theta_1 - \theta_2 + 2\alpha)}{(d^2+(a_1-a_2)^2)} + \frac{2\cos(\theta_1+\theta_2+2\beta)}{(d^2+(a_1+a_2)^2)}\right\},$$

where $a_1=R+g_{h1}/2$, $a_2=R+g_{h2}/2$ and $d=2R+g_v$, $g_{h1}$, $g_{h2}$ are the horizontal gaps between the lower and upper two magnets respectively and $g_v$ is the vertical gap. The tilt angles that minimize the potential energy are $\theta_1=\pi-\alpha-\beta$ and $\theta_2=\alpha-\beta$, where based on geometry $\tan\alpha=2d/(a_1-a_2)$ and $\tan\beta=2 d/(a_1+a_2)$.

The resulting magnetic field of the QDL system 400 may be a superposition of magnetic fields from the four magnetic sources (i.e., the four CDMs 405) with magnetization M oriented at angles $\theta_1$ and $\theta_2$ as shown in FIG. 4A. These parameters may be tuned in some embodiments to trap the diamagnetic cylinder 410 such that it is equidistant from the two pairs of CDMs 405 in the x-direction (i.e., horizontal direction perpendicular to the cylinders of the CDMs 405) and slightly below center of the two pairs of upper and lower CDMs 405 in the y-direction. That is, for a symmetric configuration of a QDL system 400, the x-direction magnetizations of the upper CDMs 405 may be opposite to those of the lower CDMs 405. In the y-direction, however, the restoring force (or spring constant) of the system 400 may not be canceled out completely (i.e., such that the diamagnetic cylinder 410 is exactly in the center of the system 400) due to gravity forces.

One feature and advantage of the QDL system 400 embodiment in FIG. 4A is that there may be three adjustable gap parameters: (i) a lower horizontal gap $g_{h1}$; (ii) a upper horizontal gap $g_{h2}$; and (iii) and a vertical gap $g_v$. These gap parameters may be tuned to achieve a very low natural oscillation frequency down to approximately 0.01 Hz. These gap parameters may also be tuned to achieve a desired stiffness coefficient of the camelback magnetic potential of the system 400. This stiffness coefficient, in turn, may affect how far the diamagnetic cylinder 410 moves in response to a given input i.e., the sensitivity of the QDL system 400 to motion.

Figure 4B:
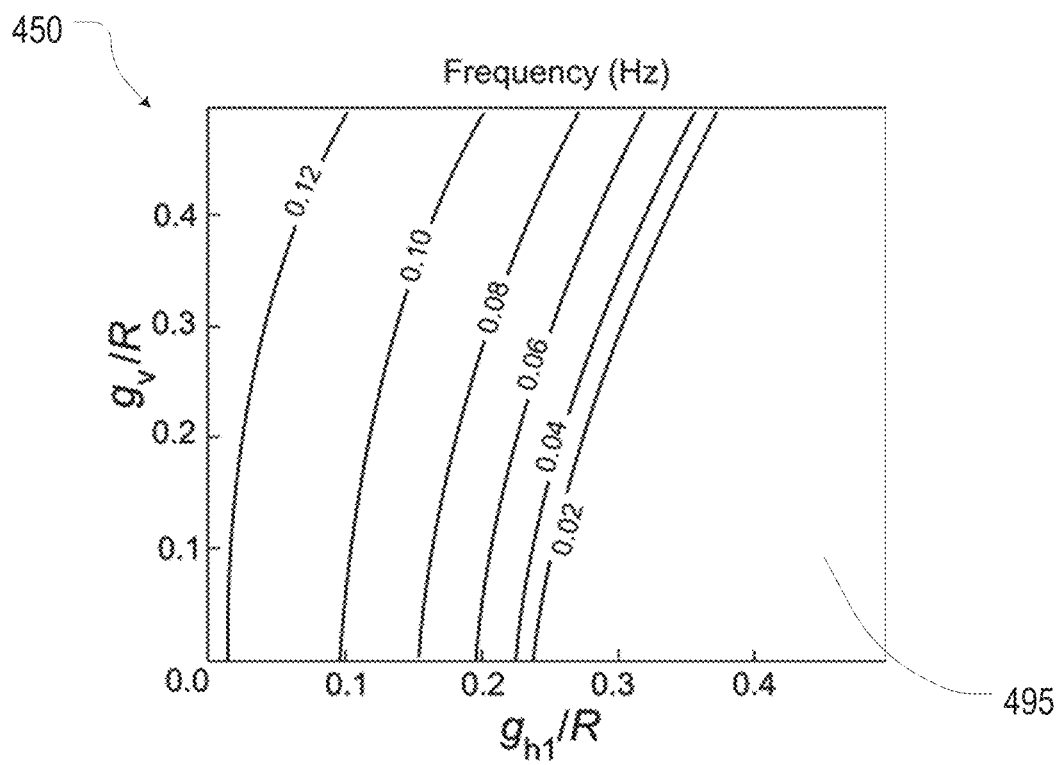
FIG. 4B is a plot illustrating a natural frequency of the QDL system in FIG. 4A with respect to gaps $g_v$ and $g_{a1}$.

FIG. 4B is a plot 450 illustrating a natural frequency of the QDL system 400 in FIG. 4A with respect to $g_v$ and $g_{a1}$. The plot 550 was created using system parameters of M=1.1×10$^6$ A/m for a neodymium alloy (e.g., NdFeB), magnet sizes radius R=3.15 mm and length L=8R, and separations $g_v$=1 mm and $g_{a2}$=1 mm. The darkest region 495 in that plot 450 corresponds to an unstable equilibrium of the diamagnetic cylinder 410 (e.g., when the diamagnetic cylinder 410 falls out of the QDL trap system 400). From this plot 450, the gap parameters that can achieve a desired natural frequency may be determined. As can seen in FIG. 4B, a natural frequency as low as about 0.01 Hz may be achieved.

Figure 5A:
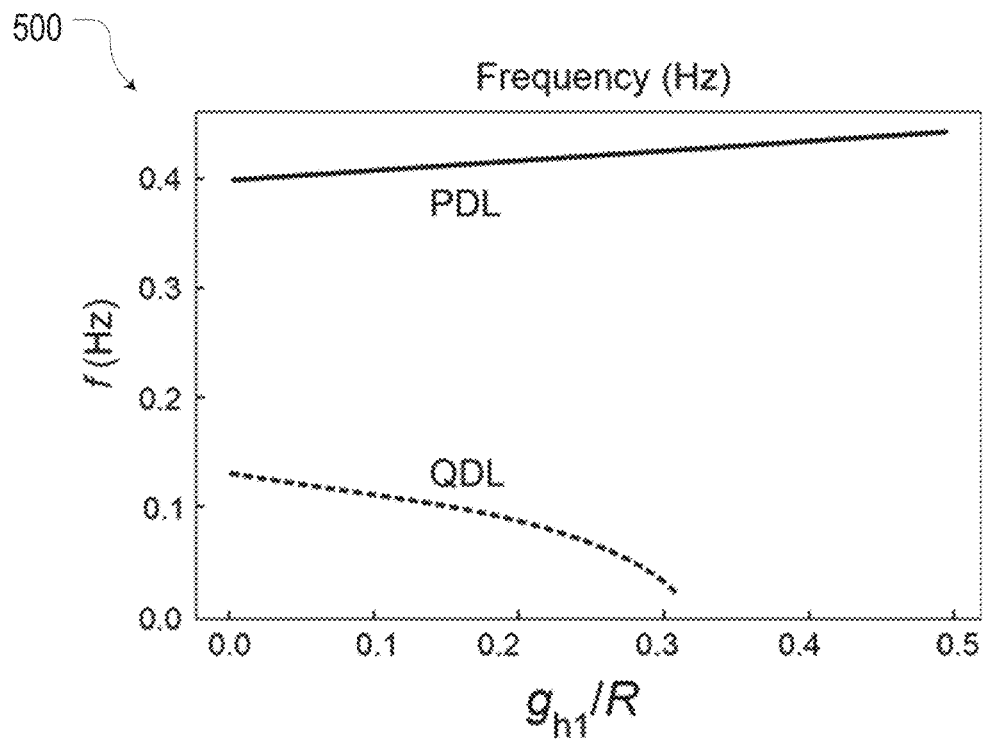
FIG. 5A is a plot showing experimental data of the QDL trap system in FIG. 4A with varying horizontal gap $g_v$ at a fixed vertical gap: $g_v$=0.317 R.

FIG. 5A is a plot 500 showing experimental data of the QDL trap system 400 in FIG. 4A with varying vertical gap $g_v$. As can be seen in FIG. 5A, reducing the vertical gap $g_v$ can lower the resulting natural frequency significantly. This effect may occur because the magnetic field from the top pair of CDMs 405 pushes down on the magnetic field from the bottom pair of CDMs, causing the camel back potential from the bottom pair of CDMs to flatten in the middle. Because the frequency of oscillation of the levitating diamagnetic cylinder is proportional to the square root of second spatial derivative of this potential, the flatter potential produces a lower oscillation frequency.

Figure 5B:
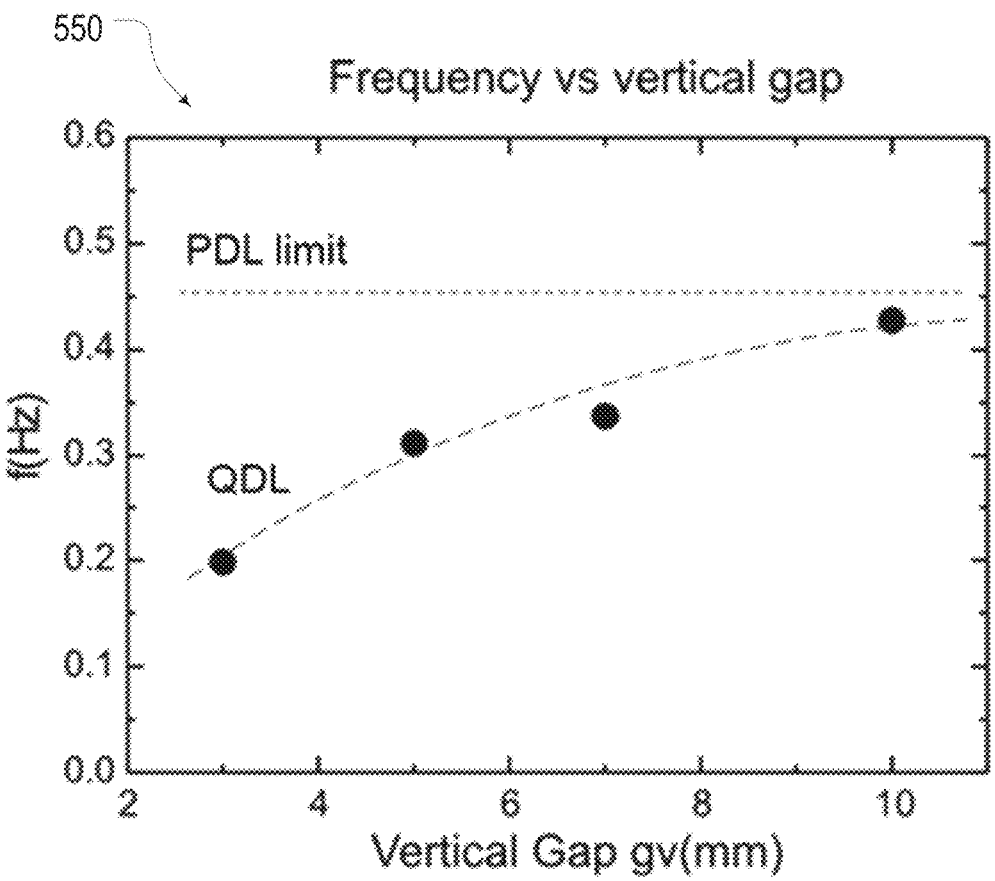
FIG. 5B is a plot comparing the natural frequencies of a two-magnet PDL of FIG. 1 to the four-magnet QDL in FIG. 4A with varying vertical gap $g_v$, at fixed horizontal gap: $g_{h1}$, $g_{h2}$=0.315 R.

FIG. 5B is a plot 550 comparing the natural frequencies of a two-magnet PDL of FIG. 1 to the four-magnet QDL 400 in FIG. 4A. This plot 550 was created using the parameters of $M=1.1\times10^6$ $Am^2$ for a neodymium alloys (e.g., NdFeB), magnet sizes R=3.15 mm and L=8R, and separations $g_v$=1 mm and $g_{a2}$=1 mm. The oscillation frequencies of a graphite cylinder 410 are given in Hertz. As can be seen in FIG. 5B, the natural frequency for the QDL system 400 may be made significantly lower than even the theoretical limit of two-magnet system of FIG. 2. This lowering of the natural frequency, in turn, may allow for detection of extremely-low frequency motion such as tele-seismic signal, infrasound, etc.

Figure 7:
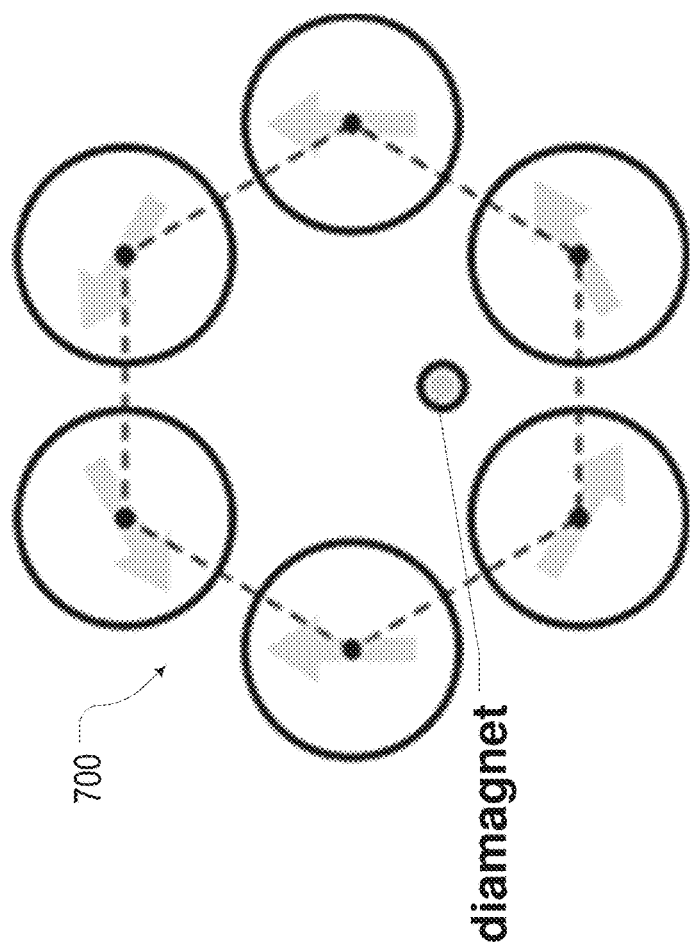
FIG. 7 is a side view of a higher order multiple dipole line trap system with six CDM magnets, consistent with some embodiments.
Figure 6:
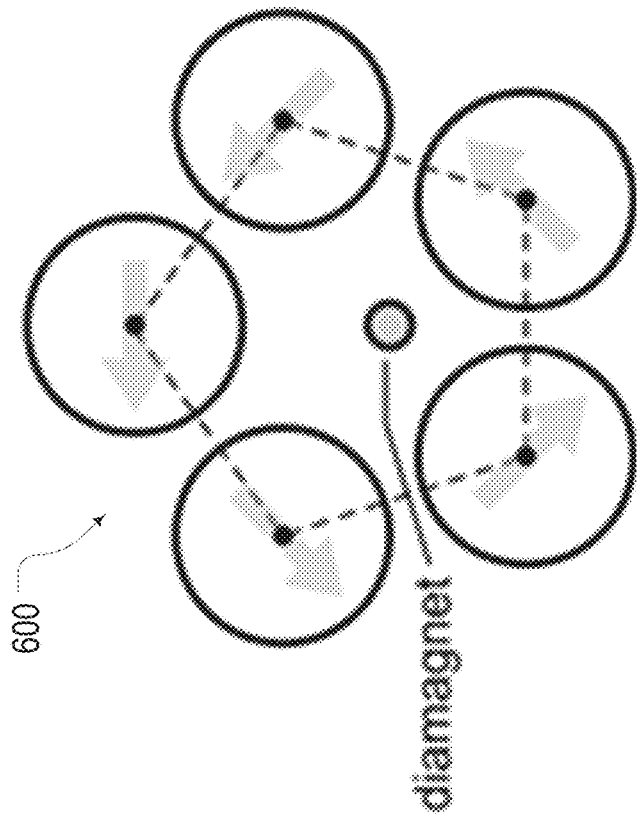
FIG. 6 is a side view of a higher order multiple dipole line trap system with five CDM magnets, consistent with some embodiments. The arrow indicates the direction of the magnetization.

FIG. 6 is a side view of a higher order multiple dipole line trap system 600 with five CDM magnets (N=5), consistent with some embodiments. FIG. 7 is a side view of a higher order multiple dipole line trap system with six CDM magnets (N=6), consistent with some embodiments. In both FIGS. 5 and 6, suitable transverse magnetization angles are also depicted.

FIGS. 8A and 8B are front and side views of an illustrative first inertial sensor 800, consistent with some embodiments. The first inertial sensor 800 may comprise four CDM magnets 805 and a diamagnetic cylinder 810. The first sensor 800 may detect a position of the diamagnetic cylinder 810 using a position detector 840. The position detector 840 may comprise a light source 842 located above the diamagnetic cylinder 810 and a split photodetector 844 located below the diamagnetic cylinder 810.

In operation, the light source 842 may comprise a small LED that provides constant illumination. The two parts of the split photodetectors 844 may independently measure a current level of illumination that it receives from the light source 842 (i.e., a maximum amount of light minus an amount of light currently blocked by the diamagnetic cylinder 810). The position of the diamagnetic cylinder 810 can thus be determined from the difference in output from the two photodetectors 844 e.g., by using a differential amplifier 848 to convert the difference in output of the split photodetectors 844 into a voltage signal proportional the difference in output.

Figure 9A:
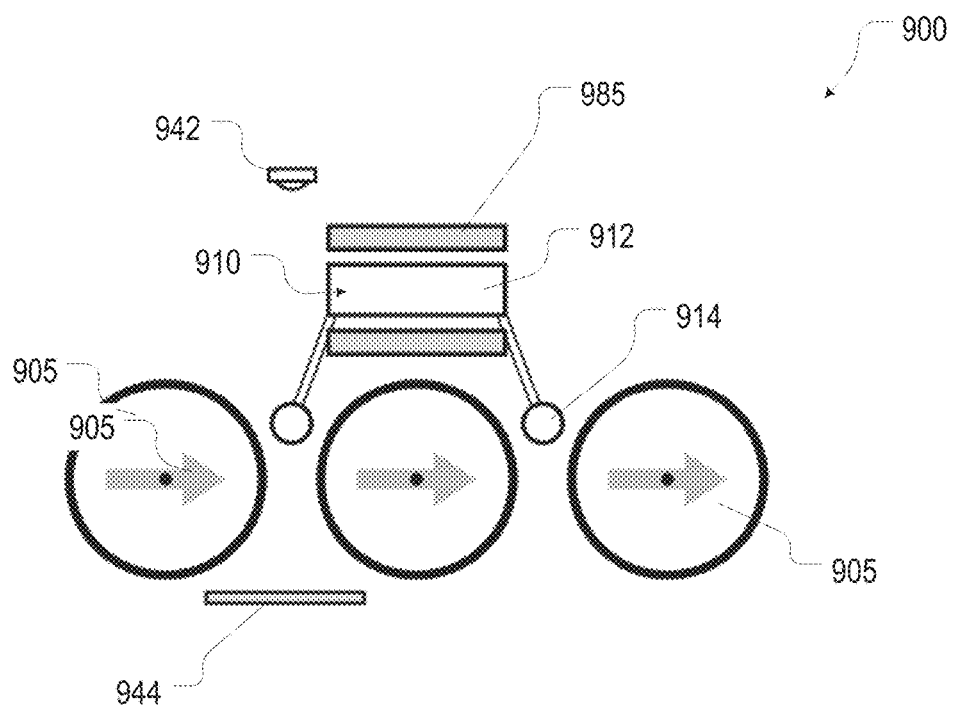
FIGS. 9A and 9B are front and side views of an illustrative second inertial sensor, consistent with some embodiments.
Figure 9B:
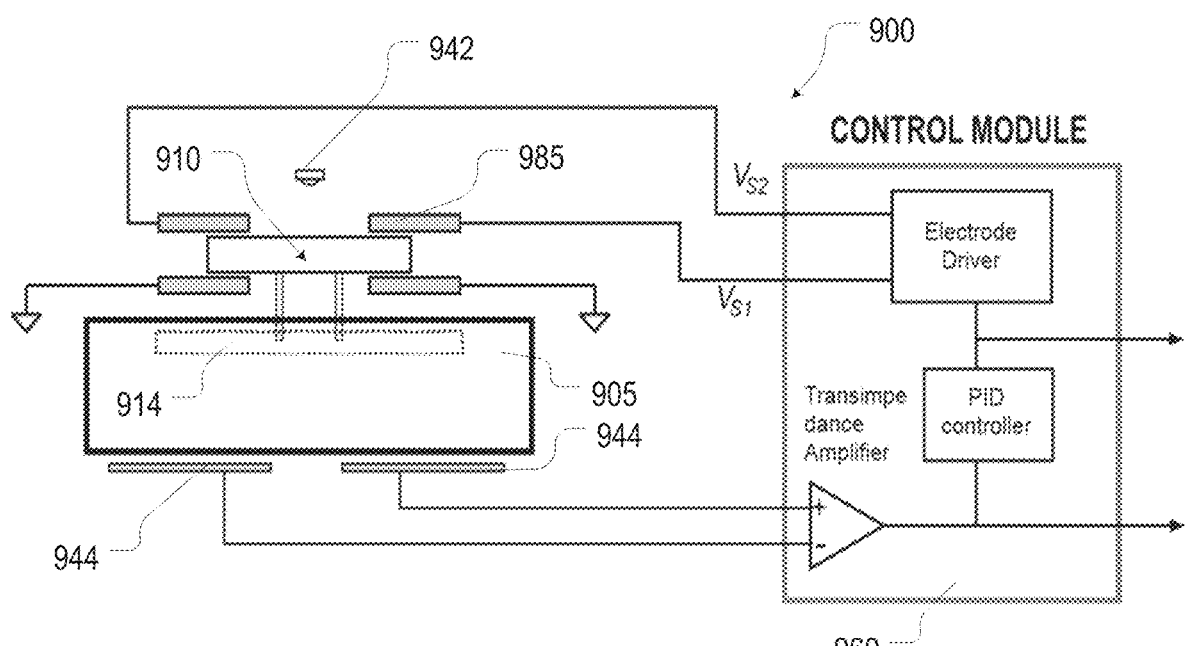

FIGS. 9A and 9B are front and side views of an illustrative second inertial sensor 900, consistent with some embodiments and particularly desirable for use as an active seismometer. This second inertial sensor 900 may comprise three CDM magnets 910 arranged in a plane and a levitating diamagnetic object (test mass) 910. The levitating diamagnetic mass 910, in turn, may comprise a diamagnetic slab 912 suspended from or supported by two diamagnetic cylinders 914. The test mass 910 (i.e., dielectric slab 912 and the diamagnetic cylinders 914) may be levitated and trapped at a center position of the sensor 900 by the camelback potential of the CDM magnets 905. The second inertial sensor 900 may further have a light source 942 and a split photo detector 944, which may generate an output proportional to a current position of the test mass 910, in a manner similar to the light source 842 and the split photodetector 844 discussed in more detail with reference to FIGS. 8A-8B.

The embodiment in FIGS. 9A-9B, however, may further comprise an electronics control module 960 adapted to generate an electric potential in metal electrodes 985. These metal electrodes 985 may also pull the test mass 910 toward the center position of the sensor 900 when energized by a voltage from the electronics control module 960. The control module 960 in this embodiment may include a proportional-integral-differential (PID) module that aims to stabilize the test mass 910 in the center of the system 900 (e.g., if the test mass 910 moves to the left, the right electrode 985 will be energized to pull the test mass 910 back to the center position). In this way, in the presence of a seismic signal or vibration, the response of the PID controller may act as an active negative (i.e., in the opposite direction of the seismic acceleration) feedback force, in addition to the passive feedback from the CDM magnets 910. Moreover, the response of the PID controller (i.e., its voltage output) will be proportional to a seismic acceleration signal. Accordingly, one feature and advantage of the second sensor 900 is that it may generate outputs indicative of both a current position and an acceleration of the test mass 910.

Another feature and advantage of the second sensor 900 embodiment is that the large size of the dielectric slab 912 may allow for either smaller voltage or stronger force for negative feedback. That is, if one of the electrodes 985 is energized by a voltage V, the dielectric slab will be pulled by a force:

$$F = \frac{1}{2}V^2 dC/dx = \frac{1}{2}(\varepsilon_r - 1)\varepsilon_0 \frac{w}{d} V^2$$

where w is the width of the electrode and $\varepsilon_r$ is the relative dielectric constant of the dielectric slab, $\varepsilon_0$ is the vacuum dielectric permittivity and d is the distance between the top and bottom electrode. In this way, the second sensor 900 embodiment may allow for use in applications where the sensor will experience strong vibrations.

FIGS. 10A, 10B, and 10C are top, side, and front views of an illustrative third sensor 1000, consistent with some embodiments. This sensor 1000 may also be particularly desirable for use as a seismometer. In FIGS. 10A-10C, the sensor 1000 may comprise two dipole line magnets 1005 that serve as a trap, a diamagnetic cylinder (e.g., graphite) 1010; a split photo detector 1044 on a bottom side; a light source 1042 on a top side adapted to illuminate the diamagnetic cylinder 1010; a glass cover 1070 with Transparent Conducting Oxide (TCO) surface electrodes 1072 on a bottom surface, and an electronics module 1060 to both detect the position of the diamagnetic cylinder 1010 and to energize the electrodes 1072.

In operation, the glass cover 1070 may have two segments of the TCO surface electrodes 1072 on the left and right. The two segments may act as electrodes of a circuit, with the CDM magnets 1005 serving as ground. If one of the surface electrodes 1072 is energized with a high voltage, it will pull the diamagnetic cylinder 1010 towards it via electrostatic interaction. The surface electrodes 1072 may be controlled by the electronics module 1060. The electronics module 1060 may include a PID component adapted such that its resulting output voltage will tend to hold the diamagnetic cylinder 1010 in the center of the sensor 1000. In this way, the surface electrodes 1072 and the electronics module may cooperate to create negative feedback. Moreover, when used in active seismometer applications, the voltage applied to the surface electrodes 1072 may be proportional to the ground acceleration, which becomes a first seismic signal output. A position of the diamagnetic cylinder 1010 is detected by the split photodetector 1044, which becomes a second seismic signal output. In this way, the third sensor 1000 may detect both position and acceleration.

Figure 11A:
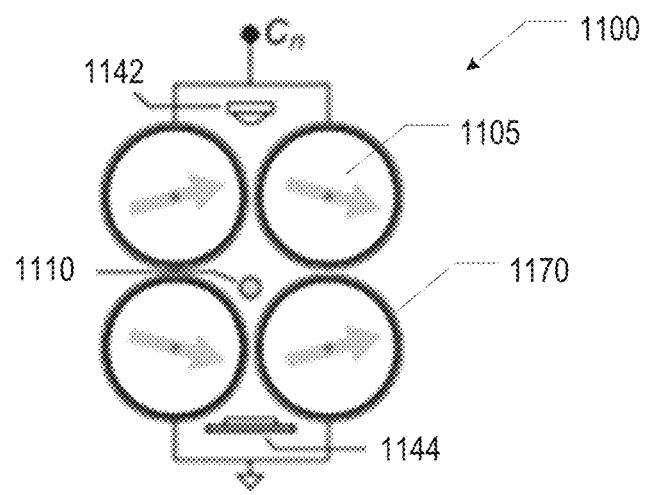
FIGS. 11A and 11B are front and side views.
Figure 11B:
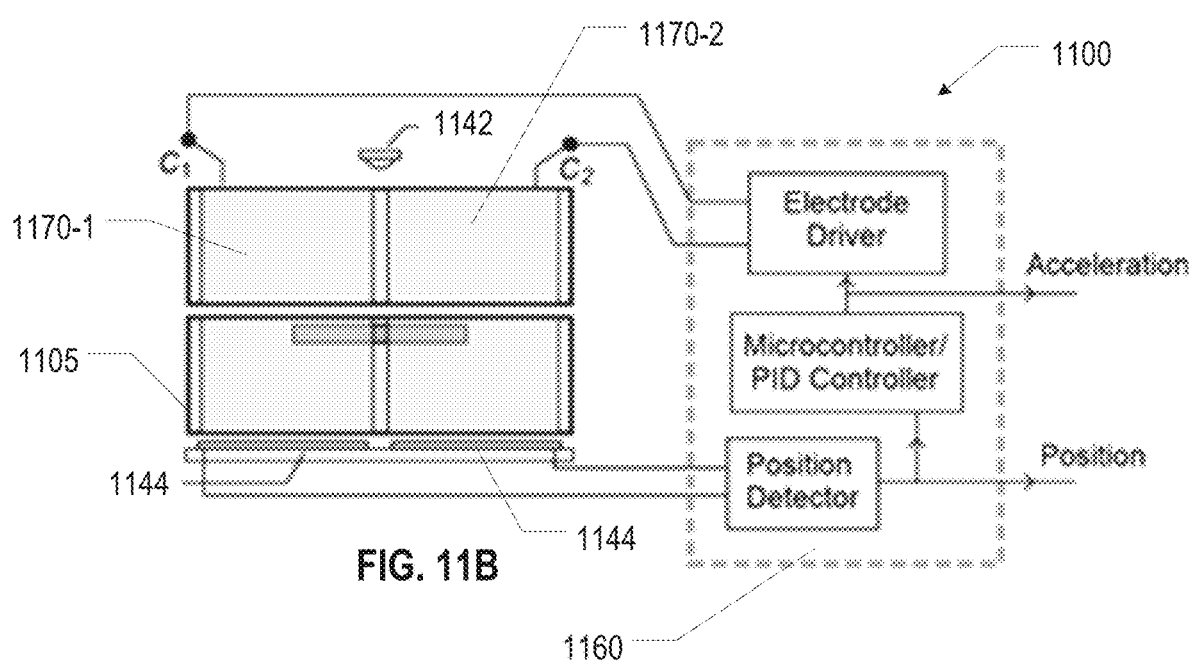
Figure 11C:
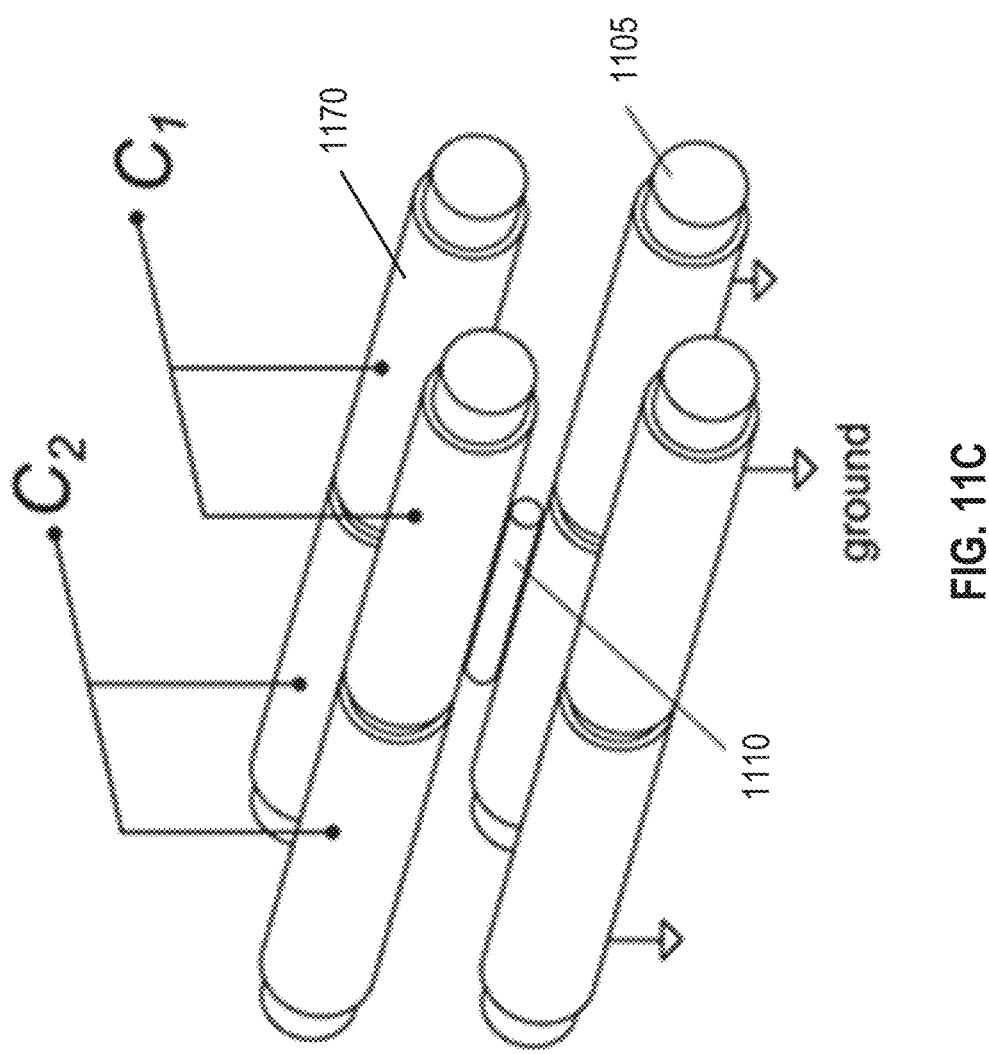
FIG. 11C is a partial perspective view, of an illustrative fourth sensor, consistent with some embodiments.

FIGS. 11A and 11B are front and side views, and FIG. 11C is a partial perspective view, of an illustrative fourth sensor 1100, consistent with some embodiments. The sensor 1100 may comprise four CDM magnets 1105; a diamagnetic cylinder (e.g., graphite) 1110; a split photo detector 1144; a light source 1142; four pairs of surface electrodes 1170 covering the CDM magnets 1105; and an electronics module 1160 to detect the position and to energize the electrodes. As described in more detail with reference to FIG. 4A, this embodiment may be desirable as the four PDL magnets 1105 may allow for a lower natural frequency, as compared to the embodiment in FIGS. 10A and 10B, due to interaction of the top and bottom PDL magnets 1105. This, in turn, may be beneficial for use as a seismometer adapted to operate at a very low frequency.

The surface electrodes 1170 in FIGS. 11A-11C may be made of thin film metal or conducting tape, and may be cast onto the respective surfaces of the CDM magnets 1105. In some embodiments, there may be two sets of surface electrodes (1170-1 and 1170-2) for the opposite side of the diamagnetic cylinder 1110. For each set of surface electrodes 1170, there may be a respective ground electrode and bias electrode. Similar to the configuration described with reference to FIGS. 9A-9B and 10A-10C, an active seismometer application may be implemented using negative feedback and the PID controller of the electronics module 1060. The voltage applied to the surface electrodes 1170 by the PID controller may be proportional to the ground acceleration which becomes the seismic signal output.

In FIGS. 11A-11C, the CDM magnets 1105 may all be aligned to the horizontal plane. Thus, they may be adapted to measure horizontal motions (e.g., north and east axis of seismometer). To further detect vertical motion, other embodiments may tilt the system as shown in FIGS. 12 and 13A-13C while applying a voltage bias to one of the electrodes to pull the diamagnetic cylinder towards it so that the diamagnetic cylinder remains at the center. In this way, the sensor may also be sensitive to the vertical motion.

Figure 12:
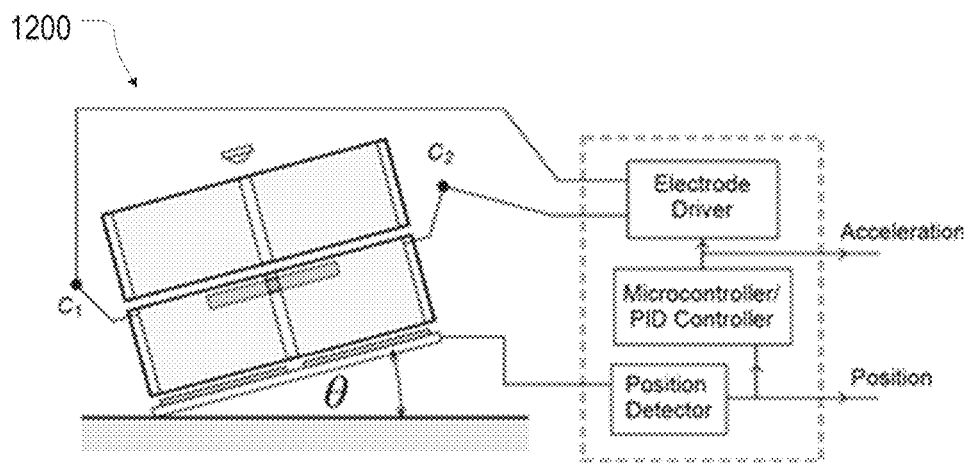
FIG. 12 is a side view of an active sensor comprising four CDM magnets in a tilted configuration, consistent with some embodiments.

FIG. 12 is a side view of an active sensor 1200 comprising four CDM magnets in a tilted configuration, consistent with some embodiments. In the basic magnetic trap configurations outlined with reference to FIGS. 1-11C, the CDM magnets are aligned to the horizontal plane, thus are optimized to measure horizontal motions (e.g., north and east axis of seismometer). To detect the vertical motion, some embodiments may tilt the axis units as shown in FIG. 12 by an angle $\theta$ to the horizontal. Some embodiments may additionally apply a voltage bias to one of the surface electrodes to pull the diamagnetic object toward it so the diamagnetic object remains at the center of the system. In this way the sensor 1200 is also sensitive to the vertical motion.

Figure 13A:
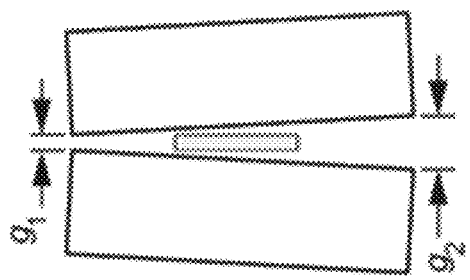
FIGS. 13A-13C are top and side views of a sensor that is sensitive to the vertical motion, consistent with some embodiments.
Figure 13B:
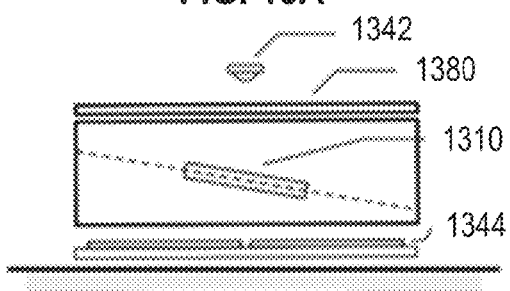
Figure 13C:
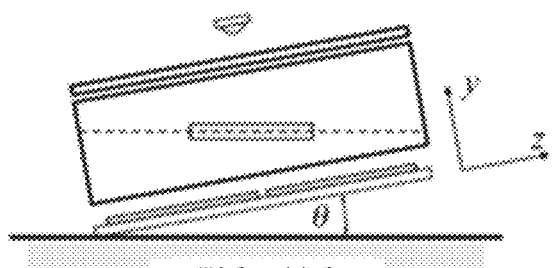

FIGS. 13A-13C are top and side views of another sensor 1300 that is sensitive to the vertical motion, consistent with some embodiments. The sensor 1300 consists of a pair of dipole line magnets 1305 with an increasing gap from $g_1$ to $g_2$. Sensor 1300 may also have a light source 1342 to illuminate a diamagnetic object 1310, a glass cover 1380 to contain the levitating diamagnetic object 1310, and a split photodetector 1344 at the bottom. The light source 1342 may cast a shadow on the split photodetector 1344 and the position of the diamagnetic object 1310 may be detected by an electronics module as discussed in more detail with reference to FIGS. 8A-8B.

In this embodiment, due to the variable gap configuration with one end of the magnet pair more separated or open then the other end, the camelback magnetic potential may be tilted to one side as shown in FIG. 13 and the diamagnetic object 1310 may rest at the minimum towards the more open side. To compensate this, the PDL trap can be tilted higher on the more open side as shown below so that the diamagnetic object 1310 remains in the center.

Figure 13D:
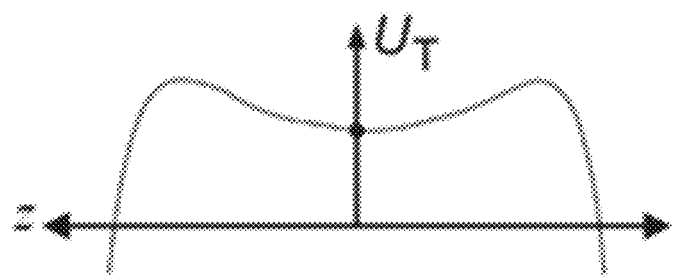
FIG. 13D shows the energy potential of the system along the longitudinal axis z in FIGS. 13A-13C.

The total confinement potential of this system may be given as:

$$U_T = \frac{\chi}{2\mu_0} B(y_0, z)^2 + \rho g(y_0 \cos\theta + z\sin\theta)$$

Where $\chi$ is the magnetic susceptibility, $\mu_0$ is the magnetic permeability, B is the total magnetic field at the graphite, $\rho$ is the mass density of the graphite, g is acceleration of gravity, $y_0$ is the height of the graphite and z is the horizontal position of the graphite along the tilted plane. The energy potential in the tilted PDL trap is shown in FIG. 13D.

Figure 13E:
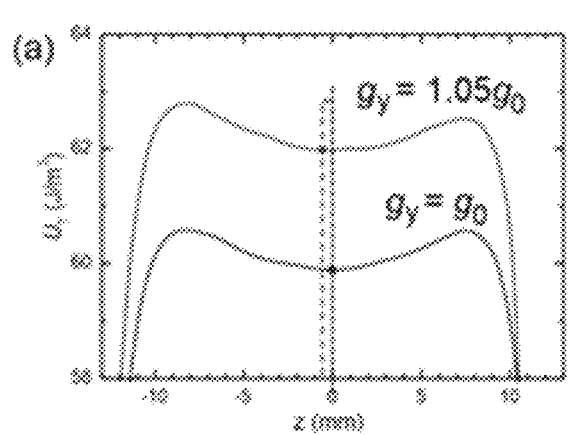
FIGS. 13E-13F shows sensitivity with respect to the vertical motion of the system in FIGS. 13A-13C.
Figure 13F:
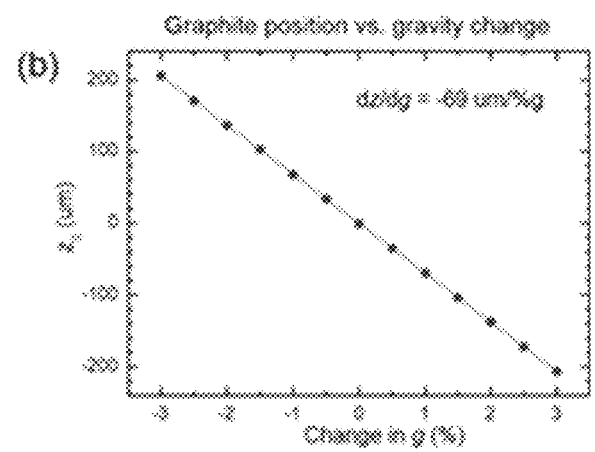

This system 1300 may have sensitivity with respect to the vertical motion, as shown in the simulation results depicted in FIGS. 13E-13F. If there is a vertical motion that increases the acceleration (e.g., by 5%) the graphite will move to the left. For an example of a typical PDL trap with length and diameter of 1"×0.25" we obtain a sensitivity of 69 µm for every percent change in g.

To decouple the three-dimensional motion in the ground frame of reference with cartesian coordinates x, y, z, some embodiments may employ a set of three sensors and a linear transformation calculation as discussed in more detail with reference to FIGS. 15A-15B FIGS. 14A-14C are side, top, and front views of another sensor 1400 that is sensitive to the vertical motion, consistent with some embodiments. This variation of the passive sensor with variable gap and tilted configuration has four CDM magnets that form a multiple dipole line trap. The top pair of CDM magnets modify the magnetic confinement potential to be flatter and have a lower resonant frequency. This way, this sensor 1400 can detect lower vibration frequency.

Figure 14C:
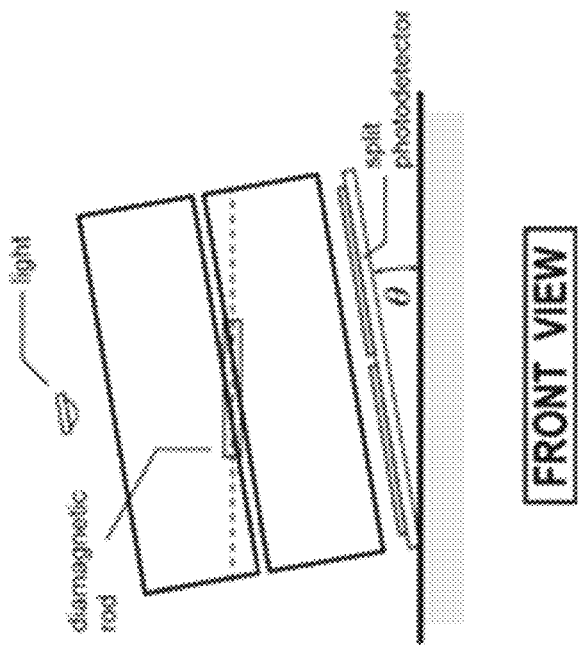
FIGS. 14A-14C are side, top, and front views of another sensor that is sensitive to the vertical motion, consistent with some embodiments.
Figure 14B:
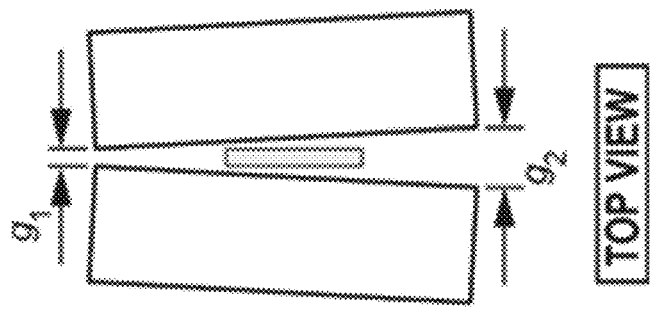
Figure 14A:
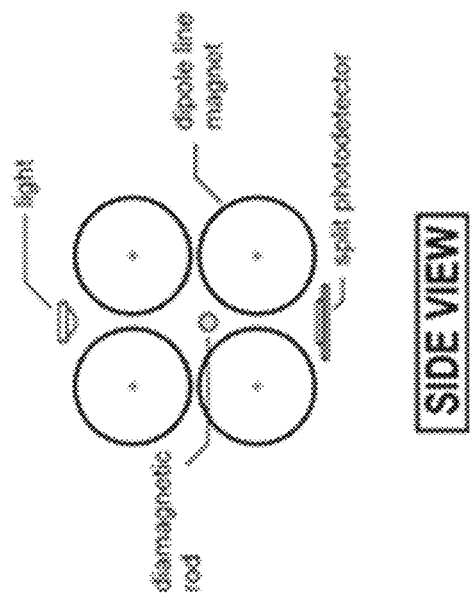

As best shown in FIGS. 13A and 14B, the two cylindrical magnets in sensors 1300 and 1400 in the vertical detection case are not parallel. That is, in such tilted embodiments, the cylindrical magnets may have one end more open than the other end (e.g., $g_2 > g_1$).

FIGS. 15A-15B are side and top views of a complete sensor unit 1500, consistent with some embodiments. The complete unit 1500 comprises three sensor modules 1525 sitting on an adjustable base platform 1530, an electronics module 1560, and rigid enclosure 1570 made of metal for electrical noise suppression. The electronics module 1560 may contain a position detector circuit, PID controller, a digitizer, and a microcomputer with internet or Wi-Fi capability to stream the data to the seismic data server. The enclosure 1570 may sit on three adjustable legs 1575 for optimum alignment with the horizontal plane and so that the sensor modules 1525 have a level base and are centered.

To achieve a fully three-dimensional motion detection in x, y and z axes (or North, West and Z in the coordinate axis of FIG. 16), this embodiment places three tilted three sensor modules 1525 (active or passive type) as shown in the figures above. Each of these sensor modules 1525 may yield seismic signals: u, v, and w. The passive sensor typically yields a displacement signal while the active sensor yields acceleration.

Figure 16:
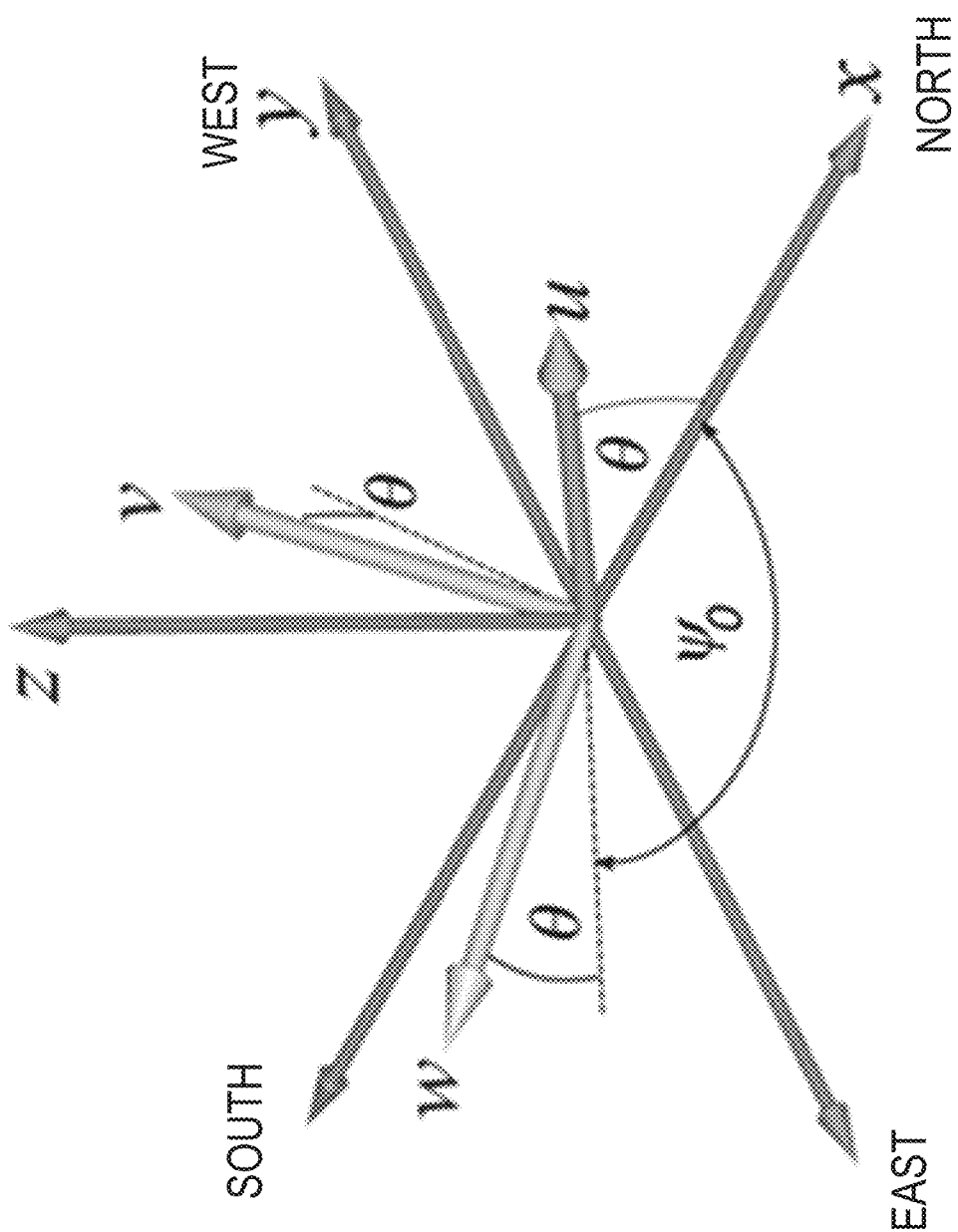
FIG. 16 is a coordinate system for 3 axes seismometer system.

By arranging each sensor module 1525 in a tilted fashion as shown in FIGS. 15A-15B, along tilted axes: u, v and w, the signals in the standard Cartesian coordinate system (x, y, z or North, West and Z in the coordinate axis in FIG. 16) can be calculated. The coordinate systems is shown in FIG. 16 and the transformation matrix is given below. The dipole line traps are assumed to be oriented with a tilt from the x, y plane equal to θ and an equal azimuthal spacing of 120° from the x axis.

$$\begin{bmatrix} x \\ y \\ z \end{bmatrix} = T \begin{bmatrix} u \\ v \\ w \end{bmatrix} \text{ where } T = \begin{bmatrix} \cos\theta & -\frac{1}{2}\cos\theta & -\frac{1}{2}\cos\theta \\ 0 & \frac{1}{2}\sqrt{3}\cos\theta & -\frac{1}{2}\sqrt{3}\cos\theta \\ \sin\theta & \sin\theta & \sin\theta \end{bmatrix}$$

While aspects of the present disclosure has been described with reference to a number of specific embodiments, other variations are within its scope. For example, some embodiments may also utilize ring-shaped magnets, instead of CDM magnets. These embodiments may levitate a spherically shaped diamagnet just above a central hole. These embodiments may be desirable for use as motion sensors or accelerometers, where the spherical diamagnet acts as a fixed internal mass and the motion of the environment is sensed by the relative motion of the magnets and housing. Ring magnets may also be desirable because they can be configured to automatically measure two-dimensional motions, as they are symmetric in two horizontal dimensions. Some embodiments using ring-shaped magnets may also include a relatively small tilt so that the diamagnet sphere does not fall out of the trap.

GENERAL

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:
1. A dipole line trap system comprising:
a first axis unit, comprising:
a first group of at least three cylindrical diametric magnets mounted in parallel around a first open region, wherein the first group of at least three cylindrical diametric magnets further define a vertical gap and a horizontal gap therebetween, and wherein a length of the horizontal gap is different than a length of the vertical gap; and
a first diamagnetic object in the first open region.
2. The dipole line trap system of claim 1, wherein the first diamagnetic object is cylindrical.
3. The dipole line trap system of claim 1, further comprising a light source and a split photodetector that cooperate to detect a current position of the first diamagnetic object.
4. The dipole line trap system of claim 1, further comprising a PID controller adapted to provide negative feedback to stabilize the first diamagnetic object in a center position.
5. The dipole line trap system of claim 4, wherein the PID controller is further adapted to produce an output proportional to a current acceleration of the first diamagnetic object.
6. The dipole line trap system of claim 1, wherein the length of the horizontal gap is larger than the length of the vertical gap.
7. The dipole line trap system of claim 1, wherein the length of the horizontal gap is smaller than the length of the vertical gap.
8. The dipole line trap system of claim 1, further comprising:
a second axis unit, comprising:
a second group of at least three cylindrical diametric magnets mounted in parallel around a second open region; and
a second diamagnetic object in the second open region;
wherein the first axis unit and the second axis unit cooperate to detect vibration in multiple axes.
9. The dipole line trap system of claim 8, wherein the first axis unit and the second axis unit are adapted to detect seismic vibrations.
10. A seismometer comprising:
at least two cylindrical diametric magnets each comprising a circular end and length, wherein each of the respective lengths of the at least two cylindrical diametric magnets are angled from horizontal and are separated by an increasing gap from respective circular ends of the at least two cylindrical diametric magnets to distal circular ends of the at least two cylindrical diametric magnets; and
a diamagnetic rod within the increasing gap that is horizontally levitated by the two cylindrical diametric magnets in equilibrium state and wherein the diamagnetic rod is adapted to detect vertical motion.
11. The seismometer of claim 10, further comprising an electrode adapted to control the horizontal levitation the diamagnetic rod by the two cylindrical diametric magnets in equilibrium state using electrostatic forces.
12. The seismometer of claim 11, wherein the electrode comprises a transparent conducting oxide (TCO) cover.
13. The seismometer of claim 10, further comprising an electronics system adapted to provide negative feedback to bias the diamagnetic rod toward a center position.
14. The seismometer of claim 13, wherein the electronics system generates signals indicative of an acceleration and a position of the diamagnetic rod.
15. The seismometer of claim 10, further comprising four cylindrical diametric magnets.
16. A dipole line trap system comprising:
a first axis unit, comprising:
a first group of at least four cylindrical diametric magnets mounted in parallel around a single open region, wherein the single open region comprises a first horizonal gap between respective circular ends of a first pair of the first group of at least four cylindrical magnets and a second horizontal gap between respective circular ends of a second pair of the first group of the at least four cylindrical magnets, and wherein a length of the first horizontal gap is smaller than a length of the second horizontal gap; and
a first diamagnetic object that is levitated by the first group of the at least four cylindrical magnets in the single open region and that is positioned relatively closer to the second pair of the first group of the at least four cylindrical magnets than the first pair of the first group of the at least four cylindrical magnets.

17. The dipole line trap system of claim 16, wherein the first axis unit has a natural frequency of less than 1 Hz.

* * * * *